J. CHIDLEY & W. H. WINTERROWD.
LOCOMOTIVE.
APPLICATION FILED SEPT. 28, 1912.
1,130,669.
Patented Mar. 2, 1915.
2 SHEETS—SHEET 1.
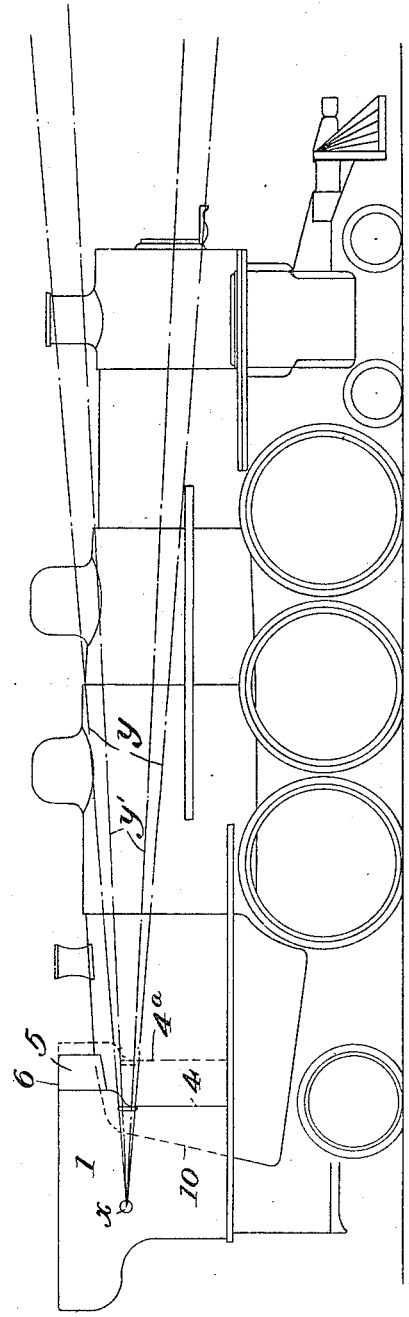
Witnesses
Jos. F. Collins.
J. M. Wynkoop.
Inventors
Joseph Chidley
and William Holland Winterrowd
By
Knight Bros
Attorneys J. CHIDLEY & W. H. WINTERROWD.
LOCOMOTIVE.
APPLICATION FILED SEPT. 28, 1912.
1,130,669.
Patented Mar. 2, 1915.
2 SHEETS—SHEET 2.
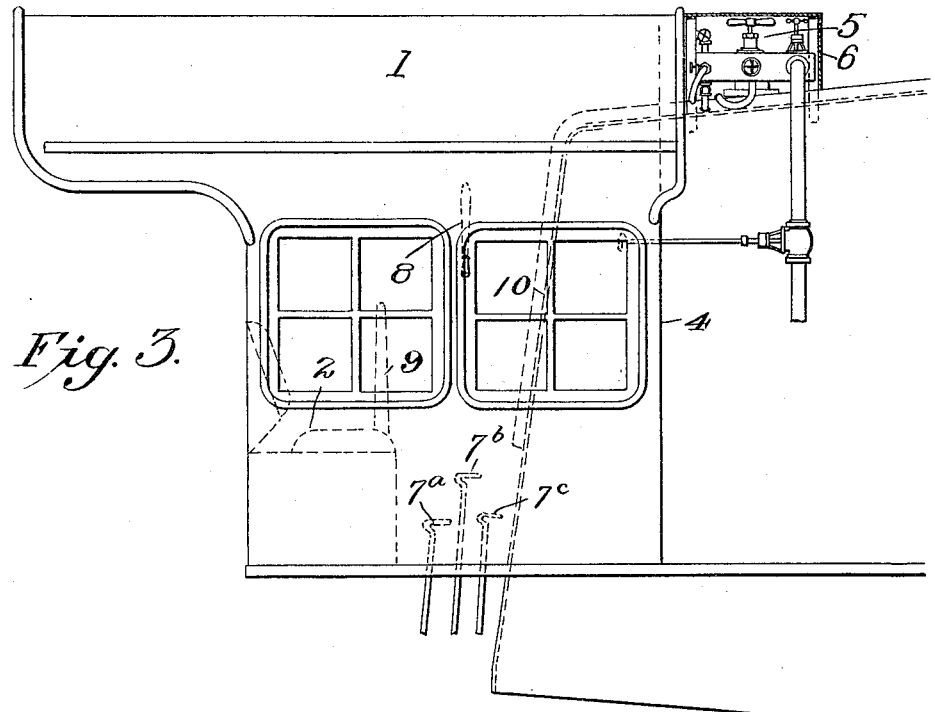
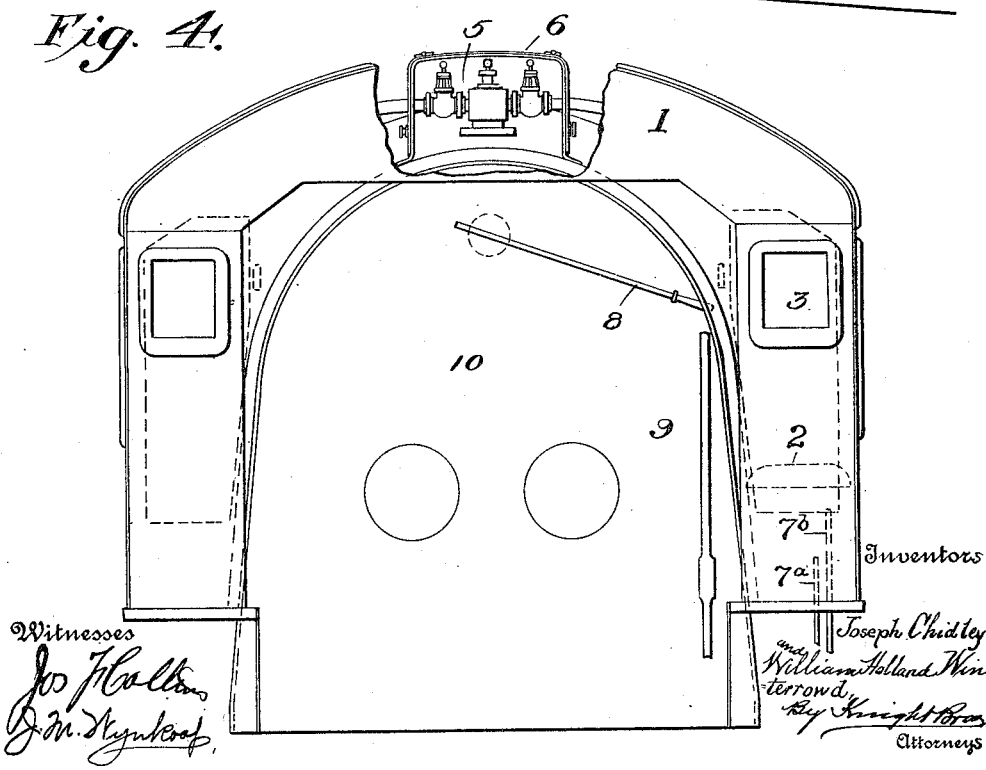

UNITED STATES PATENT OFFICE.

JOSEPH CHIDLEY AND WILLIAM HOLLAND WINTERROWD, OF CLEVELAND, OHIO.

LOCOMOTIVE.

1,130,669.  Specification of Letters Patent.  Patented Mar. 2, 1915.

Application filed September 28, 1912. Serial No. 722,993.

*To all whom it may concern:*

Be it known that we, JOSEPH CHIDLEY and WILLIAM HOLLAND WINTERROWD, citizens of the United States, residing at Cleveland, in the county of Cuyahoga and State of Ohio, have invented certain new and useful Improvements in Locomotives, of which the following is a specification.

The present invention relates to railway locomotives, and has for its object to give to the engineer a wider range of vision while occupying the position assumed in controlling the locomotive, thereby enhancing the safety of travel, by reducing the distance in advance of an approaching locomotive at which a signal must be operated to be seen by the engineer; also to render more conveniently accessible some parts of the locomotive equipment.

To these ends the invention consists in locating the front wall of the engineer's cab much closer to the engineer's station, so that the angle of vision in a vertical plane which is restricted by the upper end of the front light opening of the cab, will be greatly increased, and the engineer will be permitted to observe an elevated signal at a point much nearer to the signal than is possible with the present location of the front wall of the cab and the relatively narrow vertical angle of vision incident thereto. The front wall of the cab is located in a vertical plane between the engineer's station and the steam turret with its regulating valves, so that these accessories, which are in practice located on top of the boiler, are entirely outside of the cab and therefore very much more accessible than when located in the necessarily restricted space between the top of the boiler and the cab roof. These parts are provided with a special covering or hood which is made removable to render them accessible.

The invention will be fully understood upon reference to the accompanying drawings, in which, Figure 1 is a side view of a locomotive constructed in accordance with our invention, the relation of the front wall of the cab to the location of the corresponding part in standard locomotives as heretofore constructed, being indicated by a dotted line; Fig. 2 is a view similar to Fig. 1, on a smaller scale in which the relative vertical angles of vision attainable with the old type of construction and the present improvement, are shown schematically; Fig. 3 is an enlarged detail view of the new construction of cab with separately housed steam turret and regulating valves; and Fig. 4 is a rear view of the cab with a portion of the front wall broken away to disclose the steam turret hood.

Referring to Fig. 1, 1 represents the locomotive cab and $x$ indicates the relative location therein of the ocular or vision point available to the engineer when in the station 2 (Figs. 3 and 4) which he must occupy to be within reach of the locomotive controlling mechanism. 3 (Fig. 4) represents the front light opening of the cab through which observation is afforded to the engineer and which must be located in the front wall 4 (Figs. 1 and 3) of the cab. As the light opening 3 is necessarily restricted in dimensions, it will be seen that a relatively greater angle of vision will be afforded by the location of the front wall of the cab in the position indicated at 4, as in the present invention, instead of in the position $4^a$ indicated in dotted lines, which is the location in standard locomotives as heretofore constructed. This is particularly indicated by the diverging lines $y$ (Figs. 1 and 2) which show the vertical range of vision when the cab is constructed in accordance with the present invention, as compared with the lines $y'$ which indicate the vertical range of vision with the front wall of the cab in the dotted line position, as in standard locomotives heretofore made. It will further be observed that both the roadway and an elevated signal can be seen for a very much longer time, or at a very much closer range, with the new construction of cab than with the old; that is to say an object on the track or a signal, for instance over-head, will be cut off from view very much sooner with the old style of cab than with the new.

As indicated by the horizontal dotted line $z$ in Fig. 2, which is platted schematically to accord with actual conditions, an elevated signal cut off from view at a distance of 200 feet with the old construction of cab, would not be cut out from view, with the new style of cab, until the locomotive approached within 125 feet of the signal. This is a very important consideration since it subjects the engineer to the control of the signal system for a proportionately longer period of time, besides giving him opportunity for observation at closer range.

Another advantage of the novel construction of cab is that it leaves the steam turret 5 with its controlling valves outside of the cab, the front wall of the cab being located in a vertical plane between the steam turret and the engineer's station, so that by providing the steam turret with its own independent and removable hood 6, as shown more clearly in Figs. 3 and 4, these parts are readily accessible, whereas in the old style of cab, they were located close up beneath the roof of the cab and were accessible only at considerable inconvenience.

7ª, 7ᵇ and 7ᶜ represent the overflow valve, steam valve and water valve, respectively, 8 the throttle lever and 9 the reverse lever which define the engineer's position, inasmuch as it is necessary that he be within reach of some or all of these controlling devices, while running the engine.

10 represents the rear end of the boiler, 11 is the safety valves, 12 the steam dome and 13 the sand dome.

It will be observed from Fig. 4 that the turret hood 6 is restricted in lateral dimensions instead of being co-extensive with the cab roof, so as to avoid interfering with the range of vision from the engineer's station.

We claim:—

A railroad locomotive having a steam turret with its regulating valves located on top of the boiler near the rear end thereof, an engineer's station including engine controlling mechanism located at the rear end of the boiler, and an engineer's cab inclosing the engineer's station, with its front wall located in a plane between the engineer's station and the turret, said front wall having an observation window therein, whereby said front wall is brought nearer the engineer's station with increased vertical angle of vision, and access to the turret is unobstructed by the cab, said turret having a removable independent housing restricted in lateral dimensions to avoid interfering with the range of vision from the engineer's station.

The foregoing specification signed at Cleveland, Ohio, this 9th day of September, 1912.

JOS. CHIDLEY.
WILLIAM HOLLAND WINTERROWD.

In presence of—
B. F. KUHN,
GEO. B. FOOTE.

Copies of this patent may be obtained for five cents each, by addressing the "Commissioner of Patents, Washington, D. C."